United States Patent [19]

Pointon

[11] Patent Number: 4,907,891
[45] Date of Patent: Mar. 13, 1990

[54] FEED DEVICE FOR A CONTINUOUS FEED MIXER

[75] Inventor: Ronald H. Pointon, Formby, United Kingdom

[73] Assignee: W & A Bates Limited, United Kingdom

[21] Appl. No.: 266,286

[22] Filed: Oct. 27, 1988

Related U.S. Application Data

[63] Continuation of Ser. No. 66,007, Jun. 24, 1987, abandoned.

[30] Foreign Application Priority Data

Jul. 4, 1986 [GB] United Kingdom ............... 8616367

[51] Int. Cl.$^4$ ............................................. B28C 7/04
[52] U.S. Cl. ................................. 366/76; 366/78; 366/154; 366/156; 366/158; 366/255; 366/332; 425/205; 464/30
[58] Field of Search ................... 366/76, 78, 150, 154, 366/155, 156, 158, 266, 255, 282, 332; 192/56 R; 464/30; 425/200, 205, 207; 222/404, 146.5

[56] References Cited

U.S. PATENT DOCUMENTS

| 1,861,088 | 5/1932 | Hamel | 464/30 |
| 3,224,739 | 12/1965 | Schuur | 366/78 |
| 3,481,160 | 12/1969 | Georgi | 464/30 |
| 3,550,201 | 12/1970 | Chapman | 425/200 |
| 3,726,648 | 4/1973 | Weber et al. | 366/78 |
| 3,979,488 | 9/1976 | Greenhalgh et al. | 425/205 |
| 4,223,600 | 9/1980 | Adarraga | 366/332 |

FOREIGN PATENT DOCUMENTS

| 1392175 | 4/1975 | United Kingdom | 425/205 |
| 2173441 | 10/1986 | United Kingdom | 425/205 |

Primary Examiner—Stephen Marcus
Assistant Examiner—Christine A. Peterson
Attorney, Agent, or Firm—Stevens, Davis, Miller & Mosher

[57] ABSTRACT

A feed device (11) for a continuous mixer (12) for rubber and plastics materials. The feed device comprises a hopper (14) having a reciprocable plunger (16) located in the hopper to force material into the inlet passageway (15) of the continuous mixer. The plunger (16) is rotatable during its retraction and has an archimedian screw portion (17) that feeds material into the inlet (15) during the retraction movement of the plunger.

3 Claims, 1 Drawing Sheet

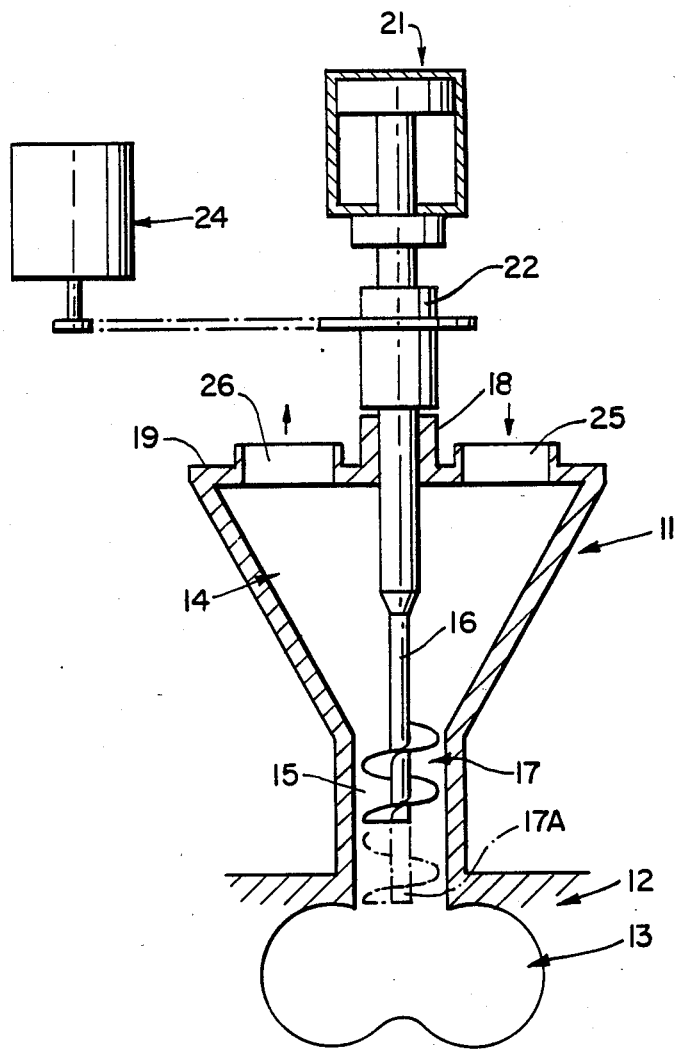

FEED DEVICE FOR A CONTINUOUS FEED MIXER

This application is a continuation, of application Ser. No. 066,007, filed June 24, 1987, abandoned.

The present invention relates to feed devices for mixers for polymeric materials and in particular to feed devices for powder or granular materials which are to be fed into a continuous mixer.

In British Patent 1550364, there is described a mixer having two parallel rotors each having a mixing section of non-helical form. Each of the rotors has a cross-section, normal to the axis of rotation, that is derived from a polygon. The rotors are arranged in two parallel cylindrical bores which open one into the other to form a substantially figure of eight chamber. Material is fed into one end of the chamber and is mixed by the rotors rotating in opposite directions and smearing the material composition over the internal surface of the chamber. The material is caused to pass down the length of the rotor to an exit by more material being force fed into the inlet at said one end.

The material is force fed into the mixer inlet by a reciprocating ram or plunger which is moved up and down within a feed hopper and the inlet by a pneumatic cylinder. The plunger is moved downward to push granular material from the hopper into the mixer chamber and is then withdrawn to push in the next batch of feed material.

This type of feed device has many disadvantages. When the plunger is withdrawn the pressure on the material feed is temporarily relieved thus briefly stopping the material feed. Furthermore, if the plunger is withdrawn too far into the hopper bridging of the feed material can occur, and conversely if the plunger is not withdrawn sufficiently the amount of feed material passed into the inlet for the next feed batch will be too small. Furthermore in order to keep sufficient load on the material in the mixing chamber so as to ensure flow through the mixing chamber, it is necessary to operate the pneumatic cylinder of the plunger at very high pressures, in the order of 200 psi. Because of frictional losses in the inlet, and blockage by the feed material this load can be greatly reduced at the chamber and can vary between the start and finish of the plunger pressure stroke.

As an alternative to a reciprocating plunger, the above Patent mentions that a screw feed device could be utilized. However, for some particulate systems, for example rubber composition particulate, these systems can cause problems in that because the screw has a larger surface area than the inlet passageway, the material tends to stick in the screw and rotates with the screw without feeding forward.

The present invention seeks to provide a feed device for continuous mixers which ameliorates the above problems.

Accordingly there is provided a feed device for a continuous mixer for rubber and plastic materials, the feed device comprising a feed reservoir and a plunger reciprocable within the reservoir to move material from the reservoir to the mixer characterized in that the plunger has an archemedian screw portion which is rotatable during retraction of the plunger so that material can be fed from the reservoir to the mixer during said retraction of the plunger.

The invention will be described by way of example and with reference to the accompanying drawing which are schematic cross-sections through a feed device according to the invention shown in situ on a continuous feed mixer.

In the drawing there is illustrated a feed device 11, suitable for use with particulate rubber composition material which is mounted on a continuous throughput mixer 12 of the type described earlier with reference to British Patent 1550364, having a pair of rotatably opposed rotors in a mixing chamber 13. The feed device 11 comprises a conical hopper (or reservoir) 14 having its narrow bottom portion connected by an inlet passageway 15 to the chamber 13 of the mixer. Mounted in the hopper 14 is a reciprocable screw plunger 16 having an archimedian screw portion 17 which is reciprocable within the inlet passageway 15 from a bottom position, shown in dotted lines 17A, just clear of the chamber 13, to a raised position, as illustrated, so that the top flights only of the screw are within the hopper, i.e. the screw portion 17 is not completely withdrawn from the inlet chamber.

The plunger 16 is mounted in a bearing 18 located in a cover 19 for the upper end portion of the hopper 14, and is caused to reciprocate by a fluid powered cylinder 21 which can be operated by hydraulic or pneumatic means. The fluid cylinder 21 is connected to the plunger 16 through a coupling 22. The rotational drive to the coupling 22 is supplied by any suitable torque drive means 24, for example, an electric motor 24 with a limited torque drive. The system being operable so that when there is a high load applied to the coupling 22 the torque drive 24 will slip but as the load on the coupling 22 falls the drive means 24 will cause the plunger to rotate. It is considered that a 10 kw drive having torque constant at 5000 Nm and rotating at 20 r.p.m. will be suitable for a feed rate of 1000 kgm/hour. The coupling 22 and fluid cylinder 21 can be carried on slide plates (not shown) which are mounted on support pillars (not shown).

The rubber composition is placed into the hopper 14 through an inlet 25 in the cover 19. Other apertures 26 in the cover may act as ventilation holes. Material is fed into the inlet passageway 15 by rotation of the screw portion 17. The material is then driven into the mixer chamber 13 by forward thrust of the fluid cylinder to achieve pressure feed along the rotor. Since the plunger is rotated through a limited torque drive means said plunger is only rotated when there is a low friction load acting thereon. At the end of the forward (or pressure) stroke the plunger screw is retracted and a rotational torque causes the plunger 16 to rotate the screw portion 17. This simultaneous retraction and rotation causes a forward flow of the particulate material along the screw flights as the plunger is retracted thus keeping a supply of material fed to the chamber 13. The simultaneous retraction of the screw will force the material to move past the flight of the screw and thereby prevents the material sticking to the screw. After full retraction, the screw portion will extend into the hopper 14 and the rotation of the screw will cause rubber composition to feed into the passgeway 15. The plunger is then driven forward again for the next high pressure cycle, and during some of this pressure stroke, the limited torque drive may not be sufficient to continue rotation when, as previously stated, the friction load acting on the plunger 16 exceeds the torque constant of the torque drive means.

The particulate material does not flow back along the screw portion during the pressure stroke due to friction along the screw flights.

The feed devices as described above will for a higher percentage of its time deliver a positive pressure to the mixer chamber 13, because during the retraction stroke the pressure will not fall to zero since the rotation of the screw portion 17 will keep up a low pressure feed. Furthermore because the screw portion 17 feeds material into the inlet and thereby prevents bridging in the hopper 14 there will be a more constant input pressure to the mixer.

It is considered that the torque limiting drive instead of being incorporated in the motor 24 could be incorporated in the coupling 22. The hopper 14 will be kept supplied with feed material through the hopper inlet 25.

I claim:

1. A feed device for mounting on a continuous mixer for rubber and plastics materials, the feed device comprising:
    a feed reservoir;
    a feed inlet passageway connecting the reservoir with the mixing chamber of said continuous mixer;
    a plunger having an archimedean screw portion and being mounted for reciprocable movement within the reservoir to move material from the reservoir, through said feed inlet passageway and into said mixer so that forward movement of the plunger drives material from the feed inlet passageway into the mixer, and retraction of the plunger returns at least a portion of said archimedean screw portion into the reservoir;
    and means for rotating said plunger, said means including a limited torque drive so that the plunger is rotatable during its retraction to feed material along the screw portion thereof from the reservoir into said inlet passageway during said retraction, and the plunger is both rotatable and non-rotatable during the forward movement while driving material into the mixer, said condition of rotation being controlled by the load on the plunger relative to the torque constant of the limited torque drive.

2. A feed device as claimed in claim 1 wherein the retraction stroke of the plunger causes at least one flight of the screw portion to enter into the reservoir, the remainder of the screw portion staying within the inlet passageway.

3. A feed device as claimed in claim 1 wherein the limited torque drive means is incorporated in a motor which rotates the screw portion.

* * * * *